(12) United States Patent
Yamaguchi et al.

(10) Patent No.: US 8,284,438 B2
(45) Date of Patent: Oct. 9, 2012

(54) IMAGE FORMING APPARATUS AND IMAGE FORMING METHOD FOR PRINTING A SEQUENTIAL PATTERN

(75) Inventors: Ryuta Yamaguchi, Kawasaki (JP); Kenji Ogasawara, Kawaguchi (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 462 days.

(21) Appl. No.: 12/267,826

(22) Filed: Nov. 10, 2008

(65) Prior Publication Data

US 2009/0147280 A1 Jun. 11, 2009

(30) Foreign Application Priority Data

Nov. 15, 2007 (JP) ................................ 2007-296721

(51) Int. Cl.
*G06K 15/00* (2006.01)
*G06F 15/00* (2006.01)
*B41J 5/30* (2006.01)
*G03G 15/00* (2006.01)

(52) U.S. Cl. ............... 358/1.18; 358/1.9; 400/61; 399/2

(58) Field of Classification Search ........................ None
See application file for complete search history.

(56) References Cited

U.S. PATENT DOCUMENTS

| 5,243,394 A | * | 9/1993 | Matsuno et al. | ................... 399/2 |
| 7,267,498 B2 | * | 9/2007 | Cahill et al. | .................... 400/62 |
| 2005/0286915 A1 | * | 12/2005 | Butikofer | ........................ 399/16 |

FOREIGN PATENT DOCUMENTS

| JP | 2001-160896 | | 6/2001 |
| JP | 2004-160980 | A | 6/2004 |
| JP | 2007-118221 | | 5/2007 |

OTHER PUBLICATIONS

Notification of Reason for Refusal in JP 2007-296721 dated Jun. 9, 2009, and an English Translation thereof.
Notification of Reason for Refusal issued in JP 2007-296721 dated Aug. 25, 2009, and an English Translation thereof.

* cited by examiner

*Primary Examiner* — Twyler Haskins
*Assistant Examiner* — Barbara Reinier
(74) *Attorney, Agent, or Firm* — Buchanan Ingersoll & Rooney PC

(57) ABSTRACT

Disclosed is an image forming method to perform a printing for a plurality of sheets of paper, comprising: expressing any one region in a first color, the one region being one of a predetermined number of regions which are provided at an end part of each sheet of the plurality of sheets of paper and are continuous in an extending direction of the end part of the sheets; expressing the other regions except the one region in a second color; and printing an additional image in which the one region expressed in the first color is shifted sequentially in the extending direction of the end part of the sheets, in an order of the printing of each sheet of paper.

7 Claims, 16 Drawing Sheets

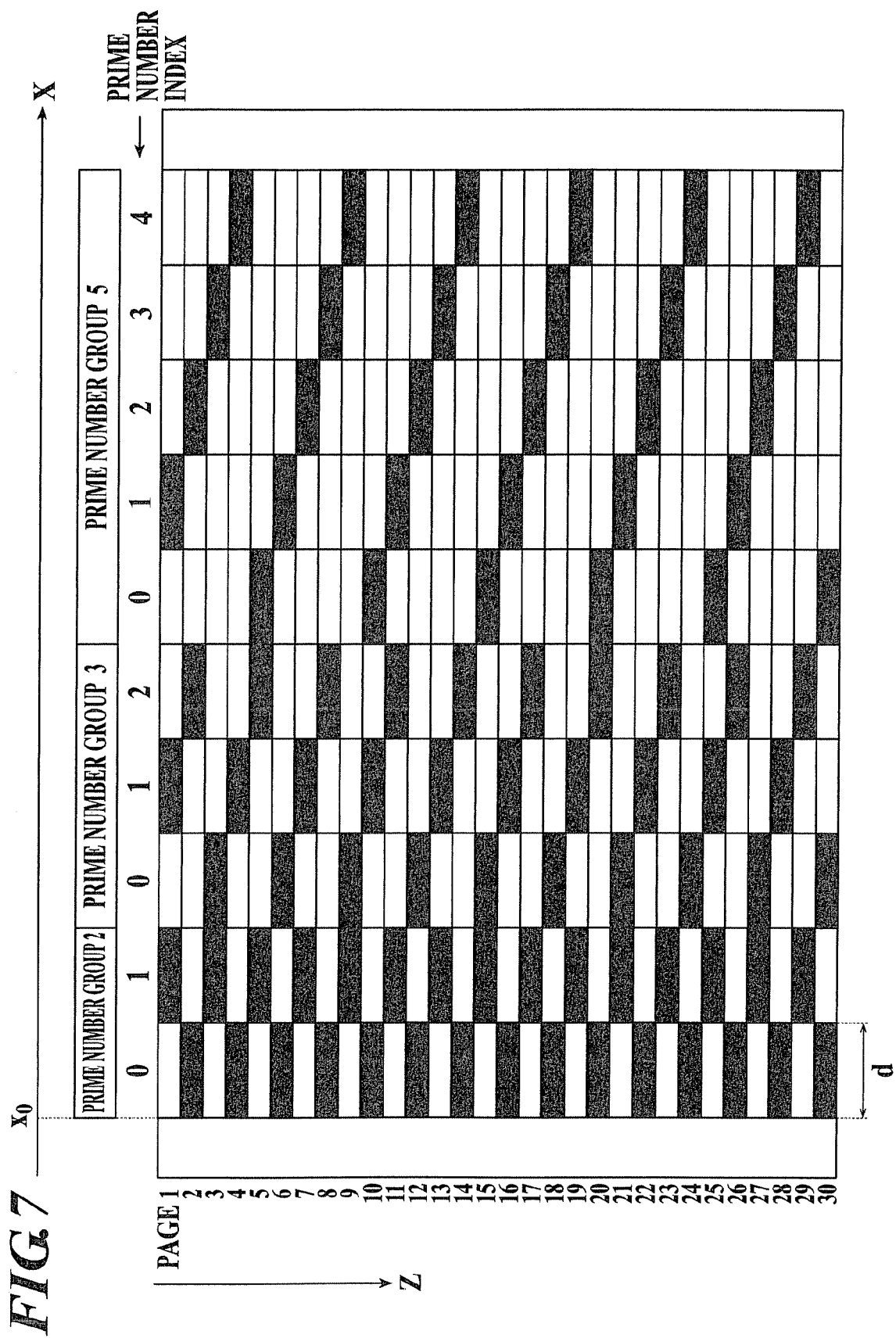

IMAGE FORMING APPARATUS AND IMAGE FORMING METHOD FOR PRINTING A SEQUENTIAL PATTERN

BACKGROUND OF THE INVENTION

1. Field of the Invention

The present invention relates to an image forming method and an image forming apparatus.

2. Description of Related Art

In recent years, the quality ensuring of printed matter which is printed by variable printing has become an important problem as the variable printing has become widely used in a print on demand (POD) field. Because the contents of all pages can be different from one another in the variable printing basically, it is very difficult to inspect every item by visual observation unlike the printed matter of offset printing.

For example, the following validation method has been used: printing additional information, such as a bar code, indicating printed contents in a margin region of printed matter, and scanning the additional information to compare the scanned data with data in a database.

Moreover, a technique of validating the consistency of image planes in a form that is composed of the plurality to image planes, by means of image plane adjusting marks corresponding to the respective image planes at the time of printing the form was proposed (see Japanese Patent Application Laid-Open Publication No. 2004-160980).

However, the method of scanning the additional information requires comparatively large scale system architecture for interlocking a scanning mechanism with a database in which different data is stored to each page, and it is difficult for a user of a business scale of chiefly performing the conventional confirmation by visual observation to introduce the method owing to its cost. Consequently, a method of performing inspection of every item by the visual observation easily as in the past has been desired.

SUMMARY OF THE INVENTION

It is an object of the present invention to enable the easy detection of an omission, duplication, or an erroneous order of printed matter.

To achieve at least one of the above objects, an image forming method reflecting one aspect of the present invention, comprises:

expressing any one region in a first color, the one region being one of a predetermined number of regions which are provided at an end part of each sheet of the plurality of sheets of paper and are continuous in an extending direction of the end part of the sheets;

expressing the other regions except the one region in a second color; and printing an additional image in which the one region expressed in the first color is shifted sequentially in the extending direction of the end part of the sheets, in an order of the printing of each sheet of paper.

Preferably, in the image forming method, the predetermined number is a prime number.

Preferably, in the image forming method, the predetermined number of regions are respectively provided for a plurality of numbers which differ from each other, and a plurality of additional images which respectively correspond to the plurality of numbers which differ from each other are printed in the end part of each sheet at positions which differ from each other.

Preferably, the image forming method comprises:

shifting an oblique line forming image by a predetermined length in the extending direction of the end part of the sheets, in the order of the printing, the oblique line forming image having a predetermined width in the extending direction of the end part of the sheets; and printing the oblique line forming image in the end part of each sheet at a position which differs from where the additional image is printed.

BRIEF DESCRIPTION OF THE DRAWINGS

The present invention will be more completely understood from the following detailed descriptions of the embodiment and the attached drawings. However, these embodiment and the drawings are not intended to limit the scope of the present invention, wherein:

FIG. 7 is a view showing a side face of a paper bundle composed of sheets of paper on each of which the prime number code image is printed;

DETAILED DESCRIPTION OF THE PREFERRED EMBODIMENT

In the following, an embodiment of an image forming apparatus according to the present invention will be described with reference to the attached drawings.

Figure 1:
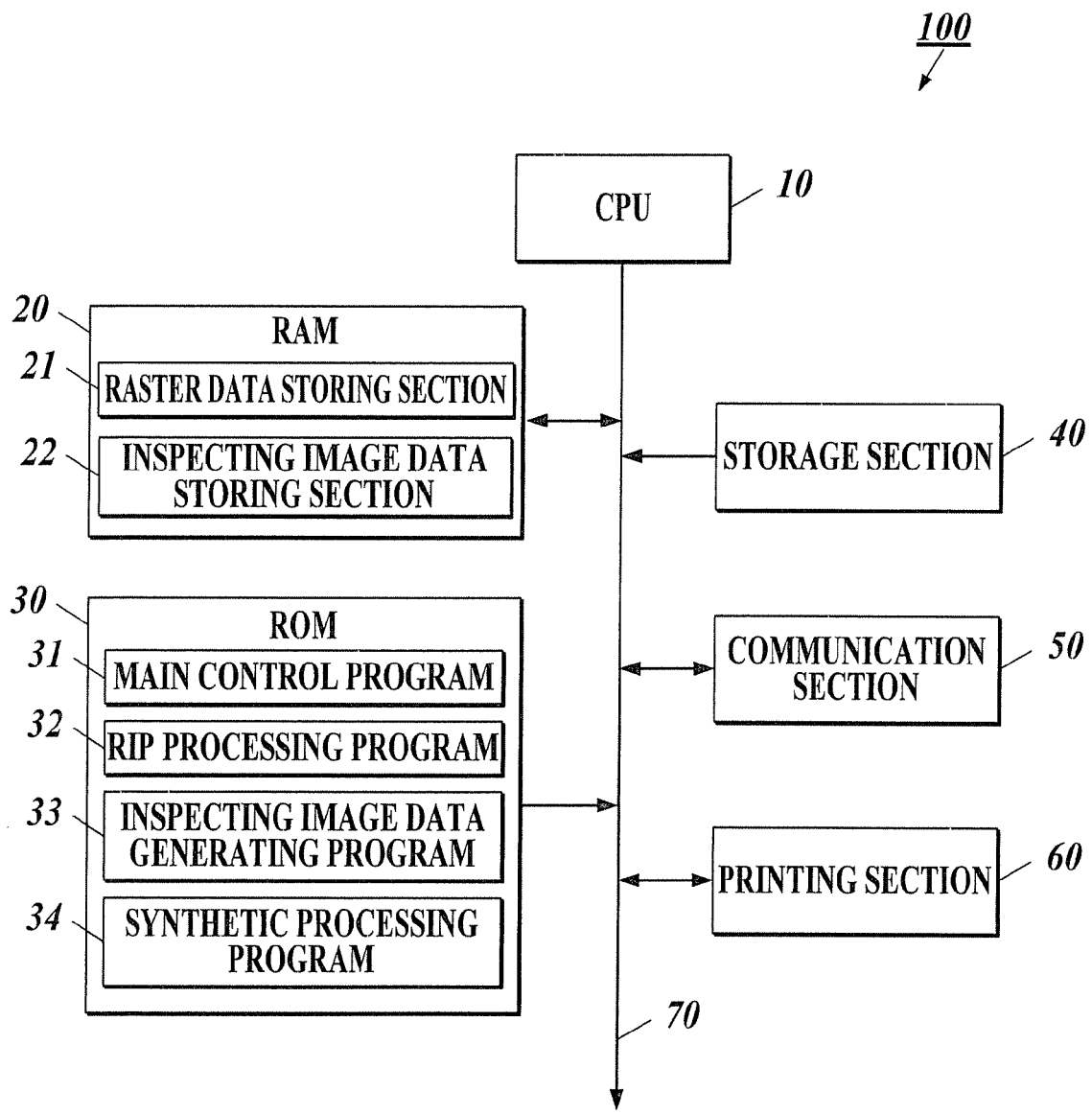
FIG. 1 is a block diagram showing the functional configuration of an image forming apparatus of an embodiment of the present invention.

FIG. 1 shows the functional configuration of the image forming apparatus 100 of the embodiment of the present invention.

As shown in FIG. 1, the image forming apparatus 100 includes a central processing unit (CPU) 10, a random access memory (RAM) 20, a read only memory (ROM) 30, a storage section 40, a communication section 50, and a printing section 60, and each section is connected to one another through a bus 70.

The image forming apparatus 100 synthesizes a printing image 81 (see FIGS. 2-6) and an inspecting image together on each of a plurality of sheets of paper, and performs the printing output of the synthesized image. The inspecting image is an image to be used at the time of performing the inspection of printed matter regarding the existence of the omission, duplication, or erroneous order of printed matter, and the like.

The CPU 10 reads various processing programs stored in the ROM 30 according to instruction signals received by the communication section 50, and collectively controls the processing operations of each section of the image forming apparatus 100 in cooperation with the read programs.

As the programs stored in the ROM 30, a main control program 31, a raster image processor (RIP) processing program 32, an inspecting image data generating program 33, a synthetic processing program 34, and the like, are given.

To put it concretely, the CPU 10 collectively controls the processing operations to be executed in the image forming apparatus 100 in cooperation with the main control program 31.

The CPU 10 performs a rasterizing process for expanding the printing image 81 to raster data in cooperation with the RIP processing program 32. The raster data of the printing image 81 generated by the rasterizing process is stored in a raster data storing section 21 in the RAM 20.

The CPU 10 performs an inspecting image data generating process (see FIG. 10) for generating the image data of an inspecting image (hereinafter referred to as "inspecting image data") in cooperation with the inspecting image data generating program 33. The inspecting image data generated by the inspecting image data generating process is stored in an inspecting image data storing section 22 of the RAM 20.

The CPU 10 synthesizes the pieces of raster data of the images to be synthesized together in cooperation with the synthetic processing program 34. To put it concretely, the CPU 10 synthesizes the raster data of the printing image 81 with the inspecting image data.

The RAM 20 forms a work area for temporarily storing various processing programs to be executed by the CPU 10 and the data pertaining to the programs. The RAM 20 includes the raster data storing section 21 and the inspecting image data storing section 22.

The storage section 40 is a storage unit, such as a hard disk, for storing various kinds of data.

The communication section 50 is a function unit to connect the image forming apparatus 100 with a network, such as a local area network (LAN), to perform data communication with external equipment.

The printing section 60 performs the image formation of an electrophotographic printing system on a sheet of paper, and includes a photosensitive drum, a charging unit to perform the charging of the photosensitive drum, an exposing unit to expose the surface of the photosensitive drum on the basis of image data, a developing unit to adhere toner onto the photosensitive drum, a transfer unit to transfer a toner image formed on the photosensitive drum to a sheet of paper, and a fixing unit to fix the toner image formed on the sheet of paper. Incidentally, the printing section 60 may be that of an ink-jet system, a thermal transfer system, or the like.

Figure 2:
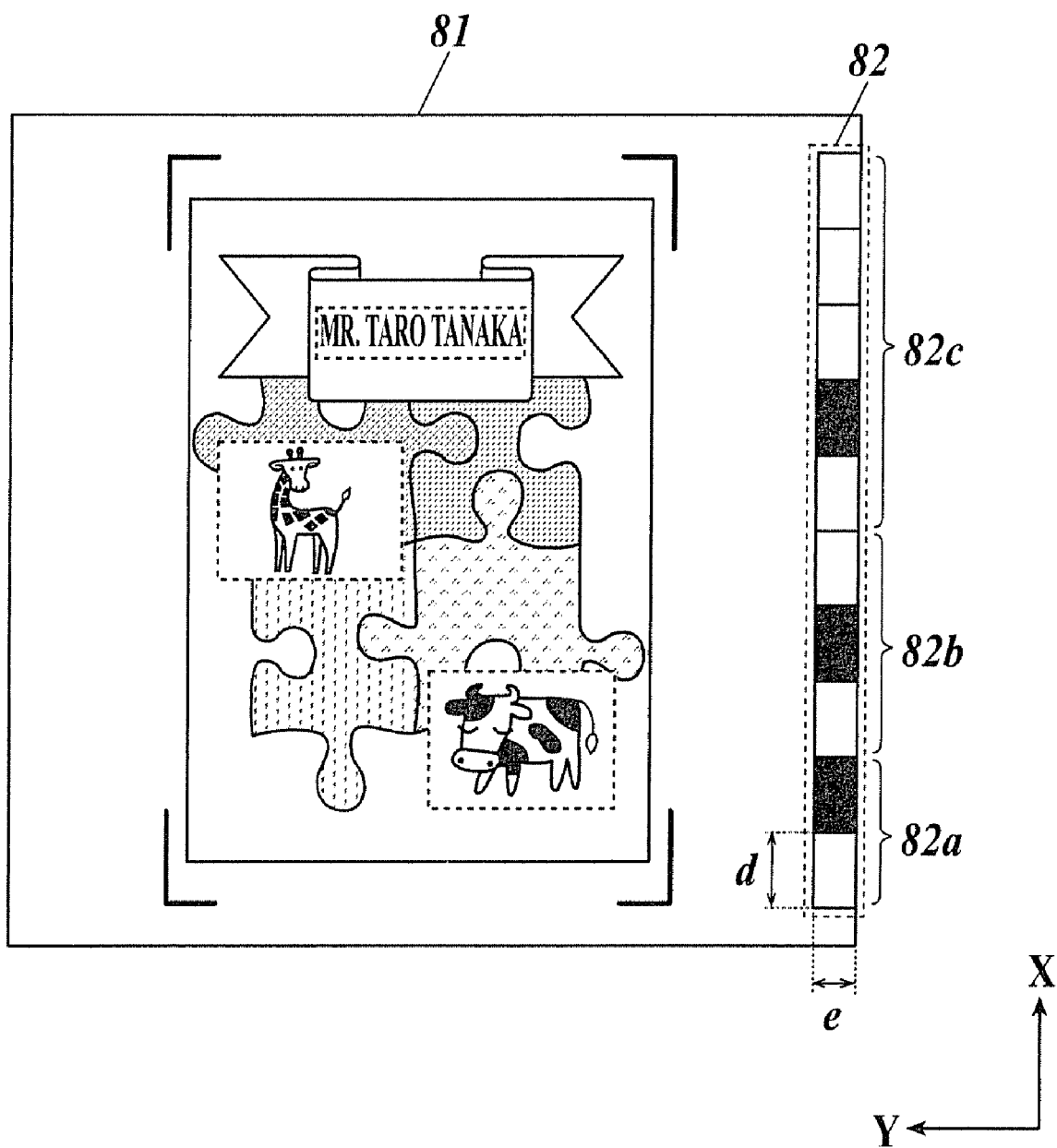
FIG. 2 is a view showing an example of the case of using a prime number code image as an inspecting image.

FIG. 2 shows an example of the case of using a prime number code image 82 as an inspecting image. In this case, the CPU 10 synthesizes the printing image 81 and the prime number code image 82 together when the CPU 10 instructs to print the printing image 81 on each of a plurality of sheets of paper. In the example shown in FIG. 2, the prime number code image 82 includes a prime number code image 82a corresponding to a prime number group "2," a prime number code image 82b corresponding to a prime number group "3," and a prime number code image 82c corresponding to a prime number group "5." Each of the prime number code images 82a, 82b, and 82c is an image formed by expressing any one region in a black color and the other regions in a white color among a previously determined number (one of prime numbers "2," "3," and "5" in the present embodiment) of regions that are formed in an end part of each of a plurality of sheets of paper and are continuous in the extending direction (X direction shown in FIG. 2) of the end part of the sheet of paper, and is an additional image to be synthesized with the printing image 81. For example, the prime number code image 82b is composed of three regions continuous in the X direction, and any one of the three regions is expressed in the black color and the other regions are expressed in the white color.

Figure 3:
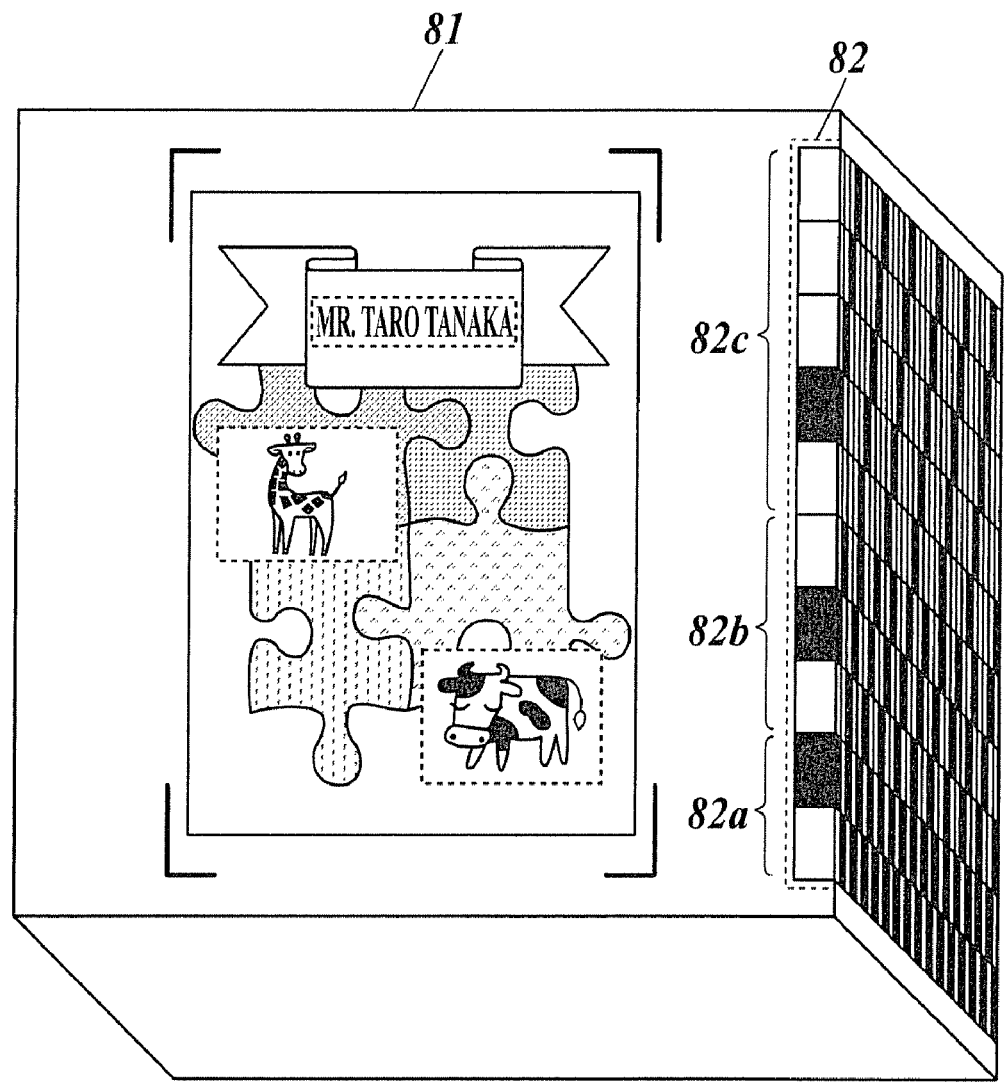
FIG. 3 is a perspective view showing an example of the case where a plurality of sheets of paper on each of which the prime number code image is printed is piled up in the order of printing.

FIG. 3 shows an example of the case of piling up a plurality of sheets of paper on each of which the prime number code images 82a, 82b, and 82c are printed, in a Z direction in the order of printing. The regions expressed in the black color are sequentially shifted to the extending direction (an X direction shown in FIG. 3) of the end parts of the sheets of paper in the order of the printing of each sheet of paper in each prime number group of the prime number code images 82a, 82b, and 82c.

Figure 4:
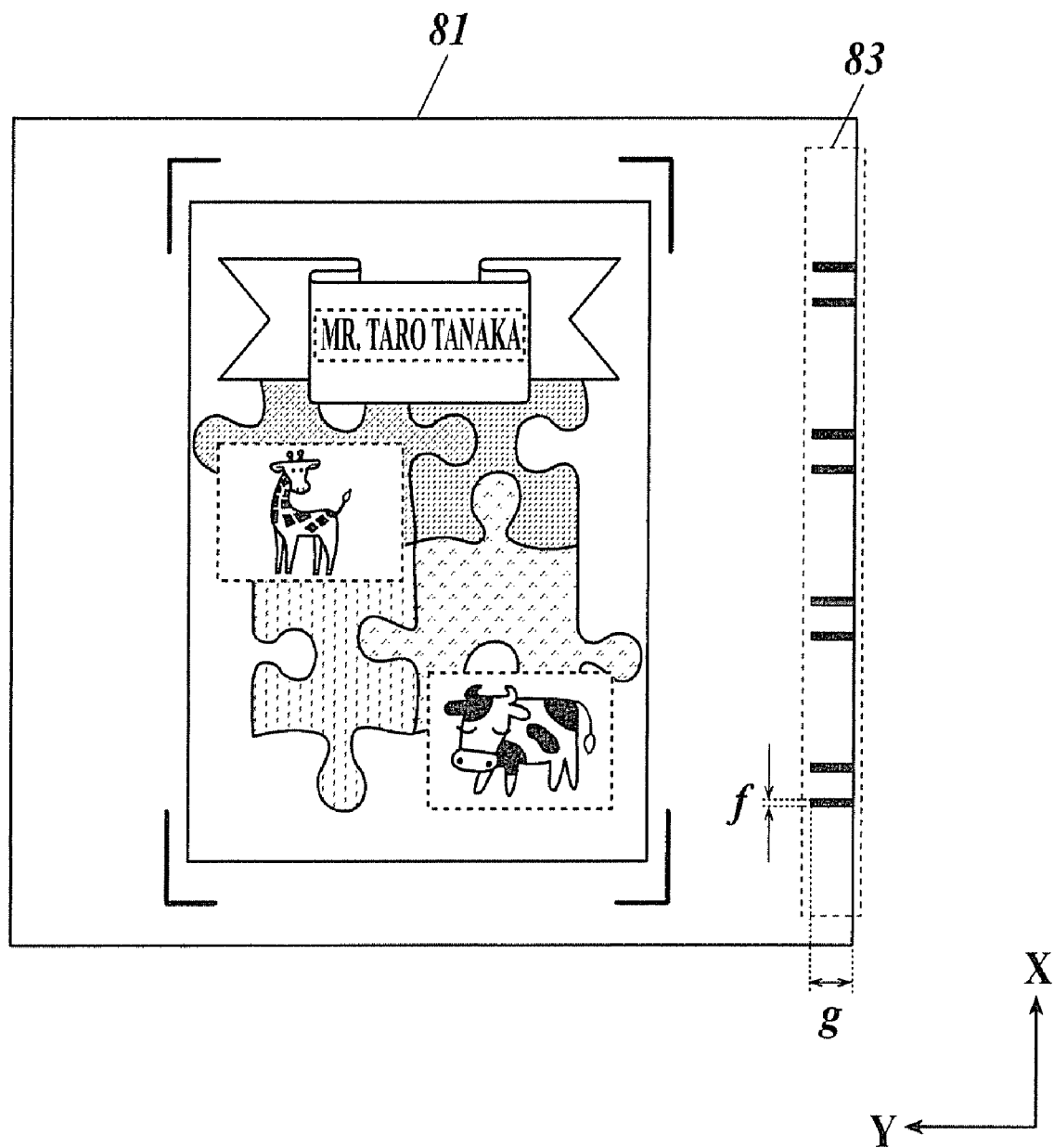
FIG. 4 is a view showing an example of the case of using an oblique line forming image as the inspecting image.

FIG. 4 shows an example of the case of using an oblique line forming image 83 as an inspecting image. In this case, the CPU 10 synthesizes the printing image 81 and the oblique line forming image 83 together at the time of printing the printing image 81 on each of a plurality of sheets of paper. The oblique line forming image 83 is an image including a plurality of lines each having a previously determined width (oblique line width f) in the extending direction (X direction shown in FIG. 4) in an end part of a sheet of paper.

Figure 5:
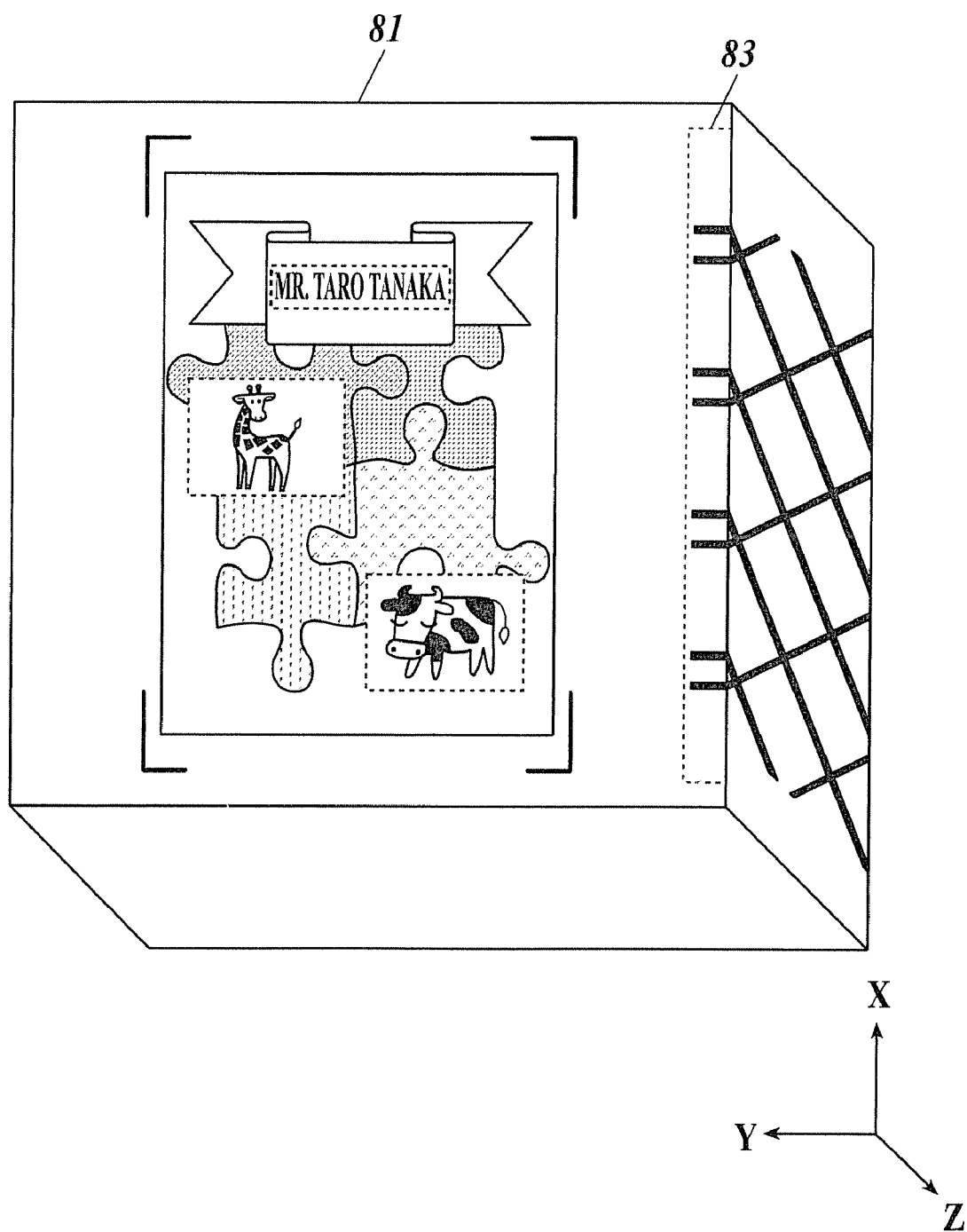
FIG. 5 is a perspective view showing an example of the case where a plurality of sheets of paper on each of which the oblique line forming image is printed is piled up in the order of printing.

FIG. 5 shows an example of the case of piling up a plurality of sheets of paper on each of which the oblique line forming image 83 is printed, in the Z direction in the order of printing. As shown in FIG. 5, the oblique line forming images 83 form oblique lines on a side face of a paper bundle when the plurality of sheets of paper is piled up in the order of printing.

Figure 6:
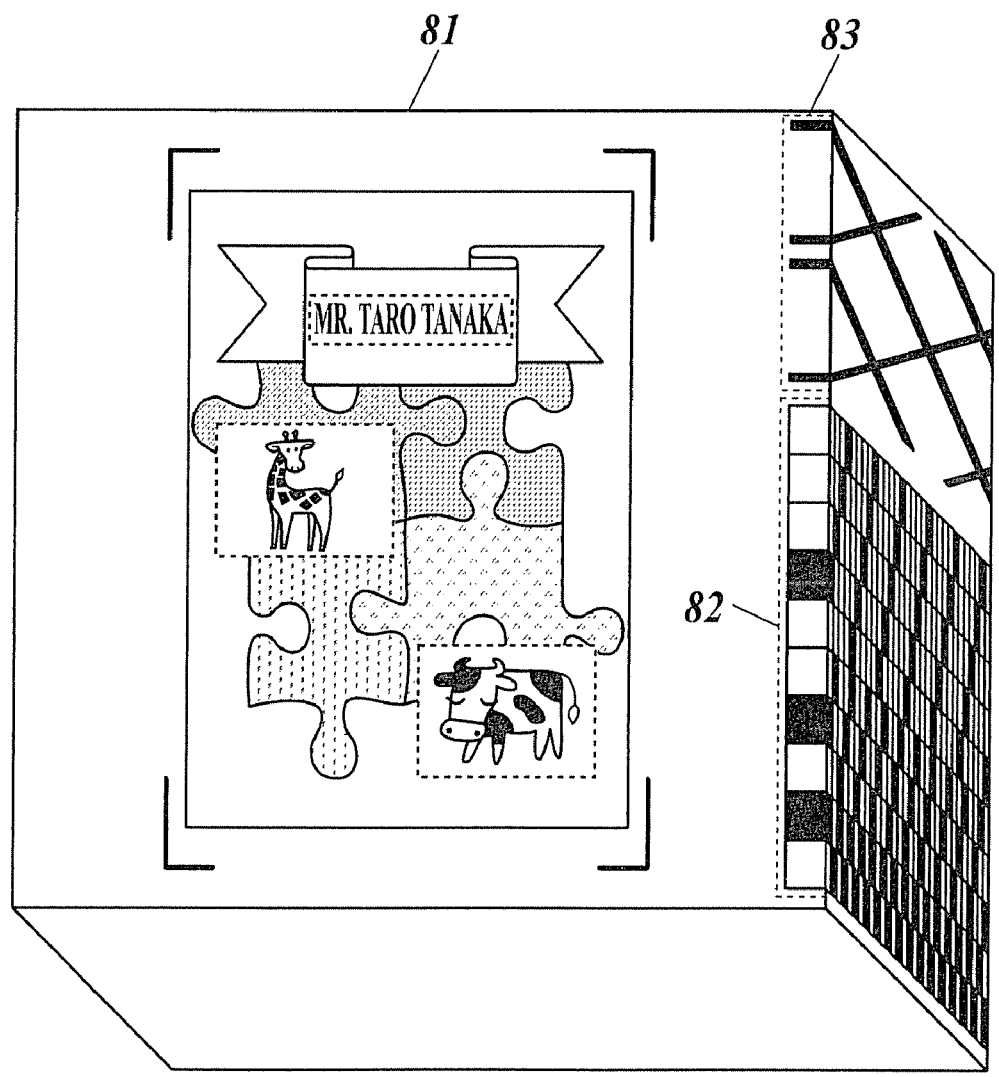
FIG. 6 is a perspective view showing an example of the case of using the prime number code image and the oblique line forming image as the inspecting image, and of piling up sheets of paper after printing in the order of printing.

FIG. 6 shows an example of the case of using the prime number code image 82 and the oblique line forming image 83 as the inspecting images and of piling up the sheets of paper after being printed in the Z direction in the order of printing. In this case, the CPU 10 synthesizes the printing image 81 with the prime number code image 82 and the oblique line forming image 83 at the time of printing the printing image 81 on each of the plurality of sheets of paper.

The image forming apparatus 100 receives a printing job from the communication section 50 via network, and performs the printing output of the printing job with the printing section 60. The printing job includes an ordinary job and a code generating job.

The ordinary job is the data of the printing image 81 of each page, and includes printer job language (PJL) data and page description language (PDL) data.

The code generating job is the information necessary for generating the inspecting image data, and includes the kind of an inspecting image. The kind of the inspecting image is the information indicating any one of a "prime number code image," an "oblique line forming image," or a "prime number code image and oblique line forming image."

When the kind of an inspecting image is the "prime number code image" or the "prime number code image and oblique line forming image," the code generating job further includes the information of the maximum value N of a prime number group, a prime number code rendering starting point $x_0$, a prime number code printing length d, and a prime number code printing width e. The maximum value N of the prime number group is the information indicating up to which prim number group the prime number code image 82 is generated among the prime numbers continuing 2, 3, 5, 7, and so forth.

FIG. 7 is a view showing a side face of a paper bundle on which the prime number code images 82a, 82b, and 82c shown in FIG. 3 are printed. The prime number code rendering starting point $x_0$ is a rendering starting point in the X direction at the time of generating the prime number code images 82a, 82b, and 82c. The prime number code printing length d is the length of each region of the prime number code images 82a, 82b, and 82c in the X direction. The prime number code printing width e is the width of each region of the prime number code images 82a, 82b, and 82c in a Y direction as shown in FIG. 2. Moreover, prime number indexes generated by numbering each region in each prime number group from "0" in order in the X direction are used for identifying each region in each prime number group as shown in FIG. 7.

For example, the regions corresponding to a prime number index "0" in a prime number group "2" are expressed in the white color, the black color, the white color, the black color, and so forth, from a first page in order. Moreover, the regions corresponding to a prime number index "1" in the prime number group "2" are expressed in the black color, the white color, the black color, the white color, and so forth, from the first page in order. That is, in each region in the prime number group "2", either of two sheets of paper is expressed in the black color.

The regions corresponding to the prime number index "0" of the prime number group "3" are expressed in the white color, the white color, the black color, the white color, the white color, the black color, and so forth, from the first page in order. Moreover, the regions corresponding to the prime number index "1" of the prime number group "3" are expressed in the black color, the white color, the white color, the black color, the white color, the white color, and so forth, from the first page in order. Moreover, the regions corresponding to the prime number index "2" of the prime number group "3" are expressed in the white color, the black color, the white color, the white color, the black color, the white color, and so forth, from the first page in order. That is, in each region of the prime number group "3", one sheet of paper among three sheets of paper is expressed in the black color.

The regions of the prime number index "0" of a prime number group "5" are expressed in the white color, the white color, the white color, the white color, the black color, and so forth, from the first page in order. Moreover, the regions corresponding to the prime number index "1" of the prime number group "5" are expressed in the black color, the white color, the white color, the white color, the white color, and so forth, from the first page in order. Moreover, the regions corresponding to the prime number index "2" of the prime number group "5" are expressed in the white color, the black color, the white color, the white color, the white color, and so forth, from the first page in order. Moreover, the regions corresponding to the prime number index "3" of the prime number group "5" are expressed in the white color, the white color, the black color, the white color, the white color, and so forth, from the first page in order. Moreover, the regions corresponding to the prime number index "4" of the prime number group "5" are expressed in the white color, the white color, the white color, the black color, the white color, and so forth, from the first page in order. That is, in each region in the prime number group "5", one sheet of paper among five sheets of paper is expressed in the black color.

When the kind of an inspecting image is the "oblique line forming image" or the "prime member code image and oblique line forming image," then the code generating job further includes the information of an oblique line rendering effective range, and includes the information of a starting point $x_1$, the oblique line width f, a printing width g, and a shift quantity p per sheet of paper, of each oblique line.

Figure 8A:
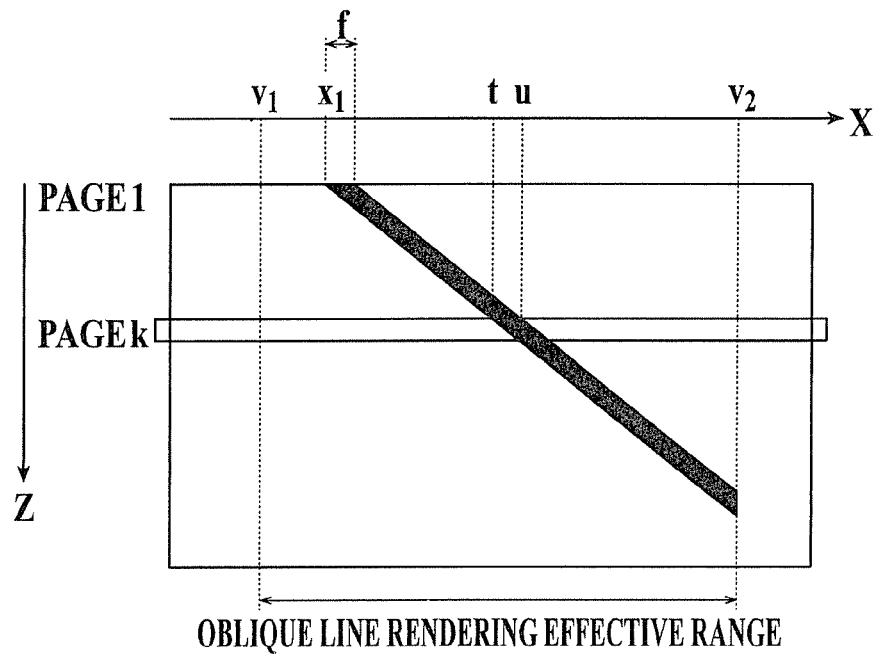
FIG. 8A is a view showing a side face of a paper bundle composed of sheets of paper on each of which the oblique line forming image is printed.

FIG. 8A is a view showing a side face of a paper bundle on which the oblique line forming image 83 is printed. The oblique line rendering effective range is a range of the paper bundle in the X direction in which the oblique line forming image 83 should be printed. In the example shown in FIG. 8A, the oblique line rendering effective range extends from a position $v_1$ to a position $v_2$. The starting point $x_1$ is a rendering starting point in the X direction of the first page of the oblique line forming image 83. Incidentally, the starting point $x_1$ may exist outside of the scope of a sheet of paper. The oblique line width f is the width of the oblique line forming image 83 in the X direction (the extending direction of the end part of a sheet of paper), and the oblique line width f is previously determined. The printing width g is the width of the oblique line forming image 83 in the Y direction as shown in FIG. 4. The shift quantity p is the length of shifting the position of the oblique line forming image 83 to the X direction for every sheet of paper, and the shift quantity p is previously determined.

The starting position t and ending position u of the oblique line forming image 83 can be obtained for each page by the following formulae (1) and (2).

$$\text{starting position } t = (\text{page number } k-1) \times \text{shift quantity } p + \text{starting point } x_1 \quad (1)$$

$$\text{ending position } u = \text{starting position } t + \text{oblique line width } f \quad (2)$$

Figure 8B:
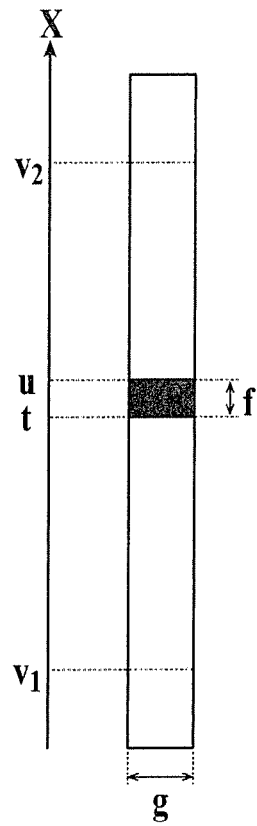
FIG. 8B is a view showing an example of a bit map of the oblique line forming image printed on each sheet of paper.

The CPU 10 generates a bit map as shown in FIG. 8B on the basis of the starting position t, the ending position u, and the printing width g.

Next, the operation of the present embodiment is described.

Figure 9:
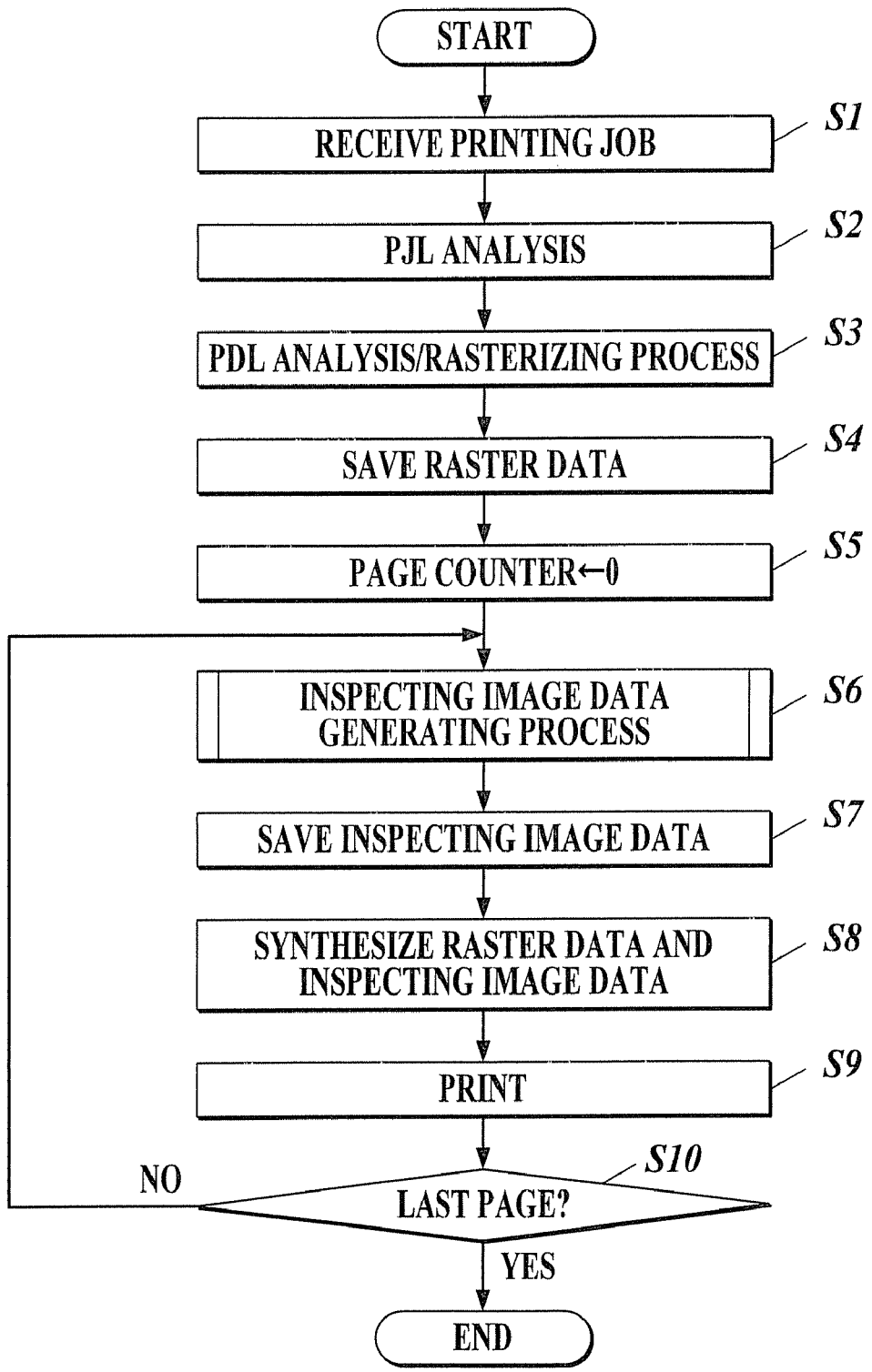
FIG. 9 is a flow chart showing a printing process to be executed in the image forming apparatus.

FIG. 9 is a flow chart showing a printing process executed in the image forming apparatus 100. The printing process is realized by a software process in cooperation with the CPU 10 and the programs stored in the ROM 30 (the main control program 31, the RIP processing program 32, the inspecting image data generating program 33, and the synthetic processing program 34).

First, when the image forming apparatus 100 receives a printing job through a network with the communication section 50 (Step S1), the CPU 10 analyzes the PJL data included in the ordinary job of the printing job (Step S2).

Next, the CPU 10 analyzes the PDL data, and performs the rasterizing process of the PDL data for generating the raster data of the printing image 81 of each page (Step S3). The raster data of the printing image 81 generated by the rasterizing process is saved in the raster data storing section 21 of the RAM 20 by the CPU 10 (Step S4).

Next, the CPU 10 sets the page counter to zero (Step S5), and performs the inspecting image data generating process (Step S6).

Figure 10:
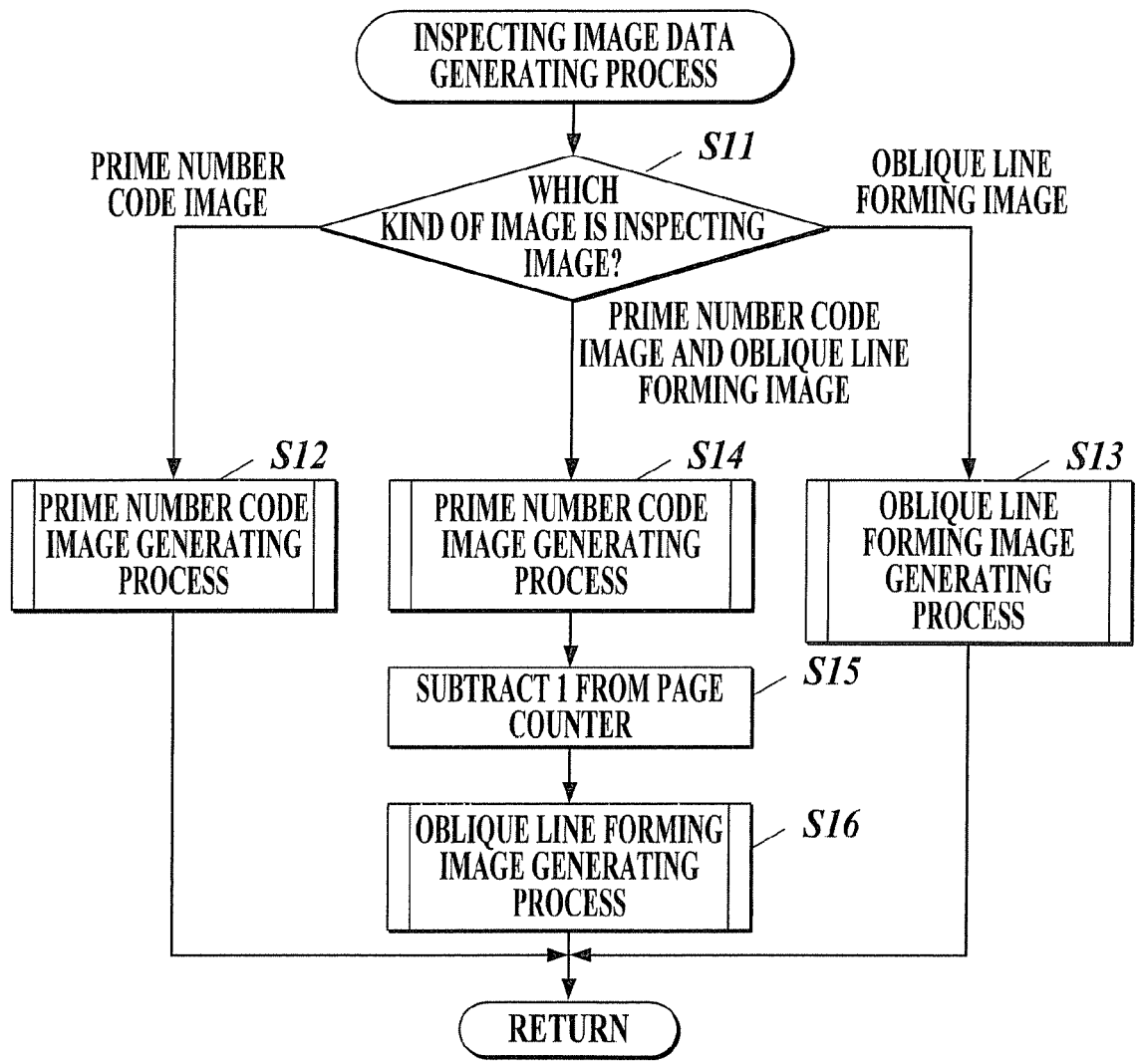
FIG. 10 is a flow chart showing an inspecting image data generating process.

The inspecting image data generating process is described here with reference to FIG. 10.

First, the CPU 10 refers to the code generating job included in the printing job, and judges which one of the "prime number code image," the "oblique line forming image," and the "prime number code image and oblique line forming image" is the kind of the inspecting image to be generated (Step S11).

When the kind of the inspecting image is the "prime number code image" as the result of the judgment (Step S11: prime number code image), then the CPU 10 performs the prime number code image generating process (Step S12).

Figure 11:
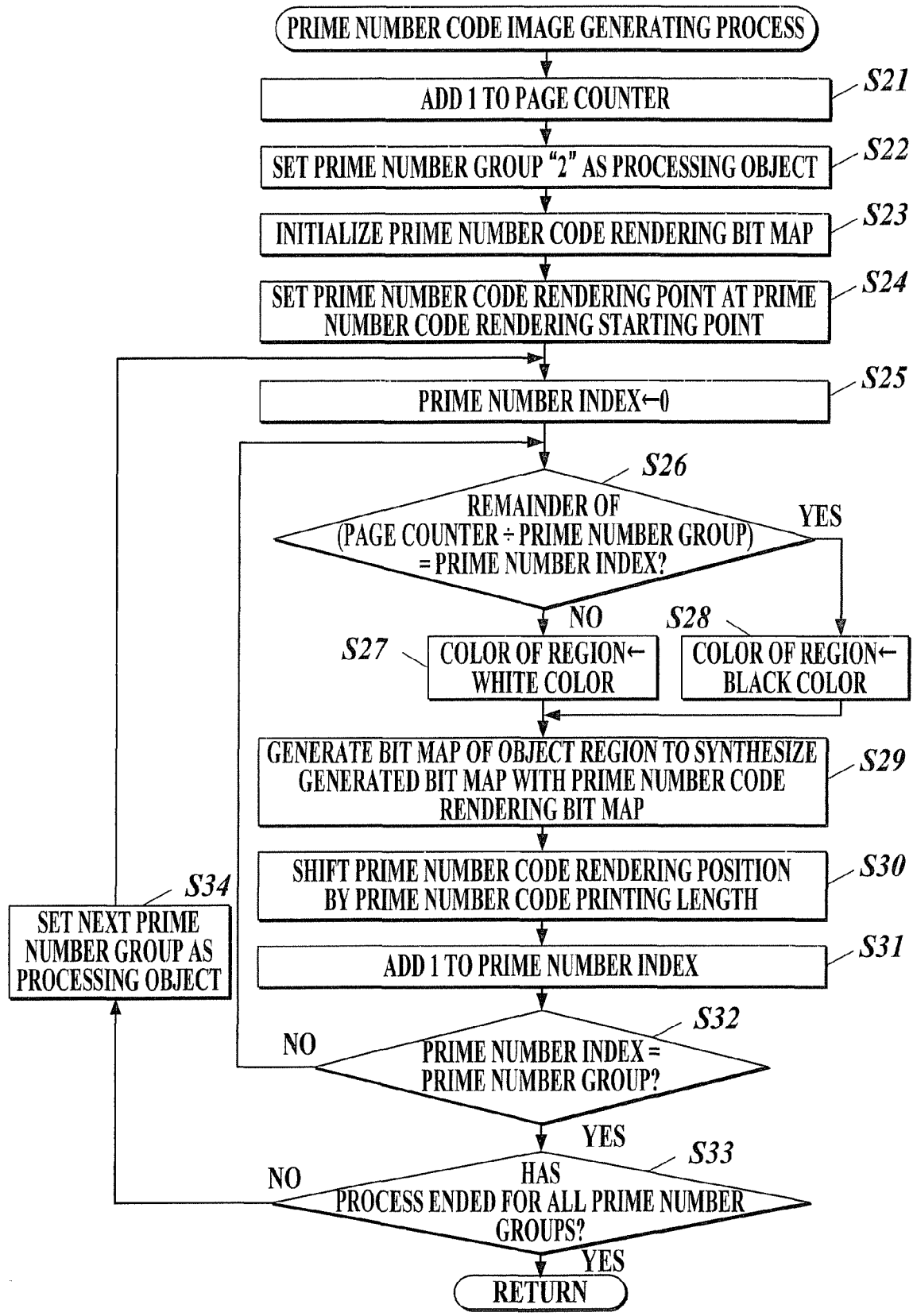
FIG. 11 is a flow chart showing a prime number code image generating process.

FIG. 11 shows the flow chart of the prime number code image generating process.

First, the CPU 10 adds one to the value of the page counter (Step S21), and sets the prime number group "2" as the processing object (Step S22). Then, the CPU 10 initializes the prime number code rendering bit map for generating the raster data of the prime number code image 82 (Step S23), and sets the prime number code rendering position at the prime number code rendering starting point $x_0$ (Step S24).

Next, the CPU 10 sets the prime number index to zero (Step S25).

Next, the CPU 10 judges whether the remainder of the division of the value of the page counter by the value of the prime number group is equal to the value of the prime number index or not (Step S26). When the remainder of the division of the value of the page counter by the value of the prime number group is not equal to the value of the prime number index as the result of the judgment (Step S26: NO), then the CPU 10 sets the color of the region corresponding to the prime number index of the processing object in the prime number group of the processing object to the white color (Step S27). On the other hand, when the remainder of the division of the value of the page counter by the value of the prime number group is equal to the value of the prime number index (Step S26: YES), then the CPU 10 sets the color of the region corresponding to the prime number index of the processing object in the prime number group of the processing object to the black color (Step S28).

After the process at Step S27 or S28, the CPU 10 generates the bit map of the object region in the set color on the basis of the prime number code rendering position, the prime number code printing length d, and the prime number code printing width e, and synthesizes the generated bit map with the prime number code rendering bit map (Step S29).

Next, the CPU 10 shifts the prime number code rendering position to the X direction by the prime number code printing length d (Step S30), and adds one to the prime number index (Step S31).

Next, the CPU 10 judges whether the value of the prime number index is equal to the value of the prime number group of the processing object or not (Step S32). When the value of the prime number index is not equal to the value of the prime number group of the processing object as the result of the judgment (Step S32: NO), then the CPU 10 returns the process at Step S26, and repeats the process from Step S26 to Step S32.

When the number of the prime number index is equal to the number of the prime number group of the processing object at Step S32 (Step S32: YES), then the CPU 10 judges whether the process for all the prime number groups (up to the maximum value N of the prime number groups) has ended or not (Step S33). When there is any unprocessed prime number groups as the result of the judgment (Step S33: NO), then the CPU 10 sets the next prime number group as the processing object (Step S34), and returns the process to Step S25. Then, the CPU 10 repeats the process to the next prime number group.

When the process for all of the prime number groups has ended at Step S33 (Step S33: YES), then the CPU 10 ends the prime number code image generating process.

When the kind of the inspecting image is the "oblique line forming image" at Step S11 shown in FIG. 10 (Step S11: oblique line forming image), then CPU 10 performs the oblique line forming image generating process (Step S13).

Figure 12:
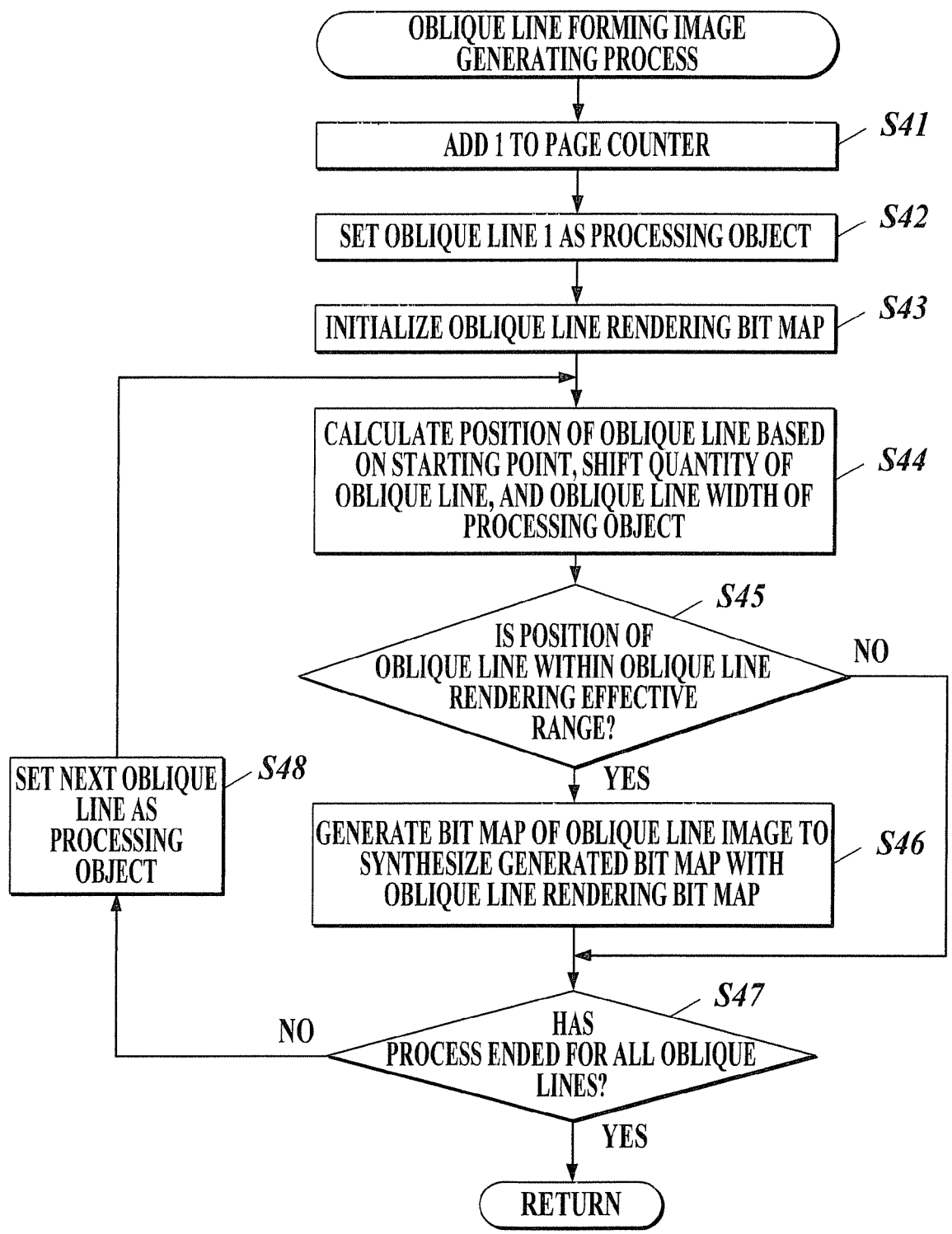
FIG. 12 is a flow chart showing an oblique line forming image generating process.

FIG. 12 shows the flow chart of the oblique line forming image generating process. The oblique lines formed on a side face of a paper bundle by the oblique line forming image 83 are distinguished as an oblique line 1, an oblique line 2, and so forth, here.

First, the CPU 10 adds one to the value of the page counter (Step S41), and sets the oblique line 1 as the processing object (Step S42). Then, the CPU 10 initializes the oblique line rendering bit map for generating the raster data of the oblique line forming image 83 (Step S43).

Next, the CPU 10 calculates the positions (starting position t and ending position u) of the oblique line of the processing object page in conforming with the formulae (1) and (2) on the basis of the value of the page counter (page number k), the starting point $x_1$, shift quantity p, and oblique line width f of the oblique line of the processing object (Step S44). Next, the CPU 10 judges whether the calculated positions of the oblique line are within the oblique line rendering effective range (from the position $v_1$ to the position $v_2$) or not (Step S45). When the positions of the oblique line are within the oblique line rendering effective range as the result of the judgment (Step S45: YES), then the CPU 10 generates the bit map of the oblique line image of the processing object on the basis of the positions (starting position t and ending position u) and printing width g of the oblique line, and synthesizes the generated bit map with the oblique line rendering bit map (Step S46).

After the process at Step S46, or when the positions of the oblique line are not within the range of the oblique line rendering effective range (Step S45: NO), then the CPU 10 judges whether the process for all of the oblique lines has ended or not (Step S47). When there are any unprocessed oblique lines as the result of the judgment (Step S47: NO), then the CPU 10 sets the next oblique line as the processing object (Step S48), and returns the process to Step S44. Then the CPU 10 repeats the process for the next oblique line.

When the process for all of the oblique liens has ended at Step S47 (Step S47: YES), then the CPU 10 ends the oblique line forming image generating process.

When the kind of the inspecting image is the "prime number code image and oblique line forming image" at Step S11 shown in FIG. 10 (Step S11: prime number code image and oblique line forming image), then the CPU 10 first performs the prime number code image generating process (Step S14). The prime number code image generating process is the same as the process shown in FIG. 11.

Next, the CPU 10 subtract one from the value of the page counter (Step S15), and performs the oblique line forming image generating process (Step S16). The oblique line forming image generating process is the same as the process shown in FIG. 12.

The prime number code rendering bit map and/or the oblique line rendering bit map are generated as the inspecting image data in this manner.

After the process at Step S12, S13, or S16, as shown in FIG. 9, the CPU 10 saves the inspecting image data generated in the inspecting image data generating process in the inspecting image data storing section 22 (Step S7).

Next, the CPU 10 synthesizes the raster data of the printing image 81 corresponding to the value of the page counter saved at Step S4 with the inspecting image data saved at Step S7 (Step S8). When the kind of the inspecting image is the "prime number code image," then the CPU 10 synthesizes the raster data (prime number code rendering bit map) of the prime number code images 82*a*, 82*b*, and 82*c* with the raster data of the printing image 81 at mutually different positions in an end part of each sheet of paper. Moreover, when the kind of the inspecting image is the "oblique line forming image," then the CPU 10 synthesizes the raster data (oblique line rendering bit map) of the oblique line forming image 83 with the raster data of the printing image 81 in the end part of each sheet of paper. Moreover, when the kind of the inspecting image is the "prime number code image and oblique line forming image," then the CPU 10 synthesizes the raster data (prime number code rendering bit map) of the prime number code images 82*a*, 82*b*, and 82*c* with the raster data of the printing image 81 at mutually different positions in the end part of each sheet of paper, and synthesizes the raster data (oblique line rendering bit map) of the oblique line forming image 83 with the raster data of the printing image 81 at a different position from the positions where the prime number code images 82*a*, 82*b*, and 82*c* are printed in the end part of each sheet of paper. Then, the CPU 10 performs the printing on the basis of the data of the synthesized image with the printing section 60 (Step S9).

Next, the CPU 10 judges whether the printed page is the last page or not (Step S10). When the printed page is not the last page (Step S10: NO), then the CPU 10 returns the process to Step S6 to repeat the process from Steps S6 to S10.

On the other hand, when the printed page is the last page (Step S10: YES), then the CPU 10 ends the printing process.

Figure 13A:
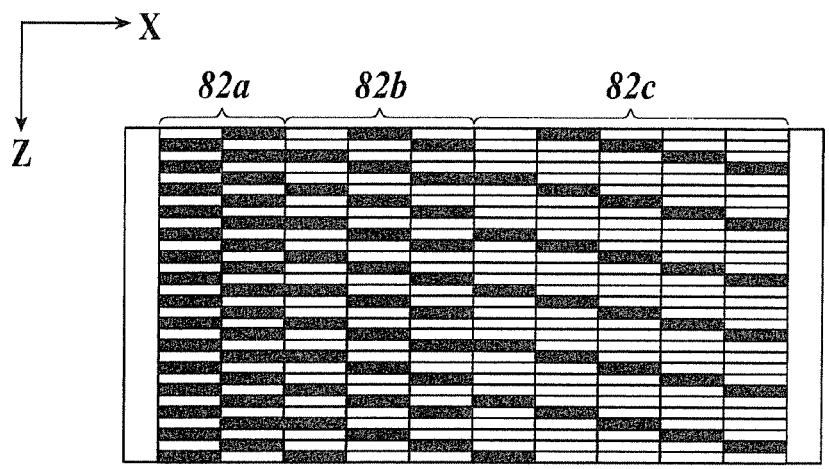
FIG. 13A is a view showing a side face of a paper bundle in which a plurality of sheets of paper on each of which the prime number code image is printed is piled up in the order of printing.

FIG. 13A is a view showing a side face of a paper bundle bundled by piling up a plurality of sheets of paper on each of which the prime number code images 82*a*, 82*b*, and 82*c* are printed as the inspecting images, in the order of printing. The X direction and the Z direction shown in FIG. 13A correspond to the X direction and the Z direction shown in FIG. 3, respectively. When there are no omissions, duplication, and erroneous orders in the printed matter, then a repetition pattern in which the regions expressed in the black color among the respective regions of the prime number code images 82*a*, 82*b*, and 82*c* sequentially shift to the X direction in the order of the printing of each sheet of paper is formed for each prime number group as shown in FIG. 13A.

Figure 13B:
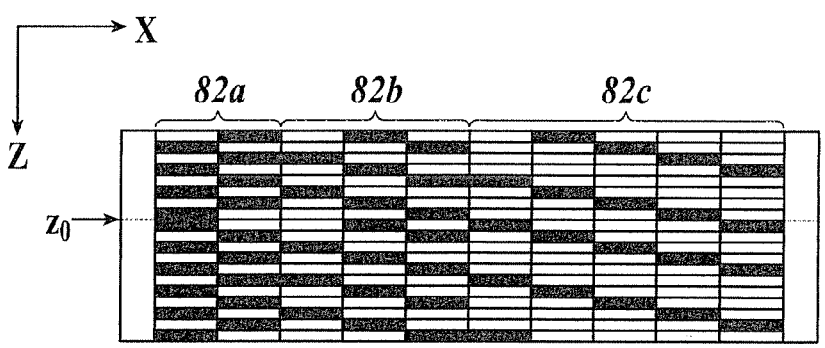
FIG. 13B is a view showing an example of the case where a sheet of paper is omitted in the paper bundle of the plurality of sheets of paper on each of which the prime number code image is printed.

FIG. 13B is a view showing an example of the case where a sheet of paper at position $z_0$ is omitted in a paper bundle of the sheets of paper on each of which the prime number code images 82*a*, 82*b*, and 82*c* are printed. Disorder is caused in repetition patterns formed by the prime number code images 82*a*, 82*b*, and 82*c*, and consequently the existence of a printing error can be recognized.

Figure 13C:
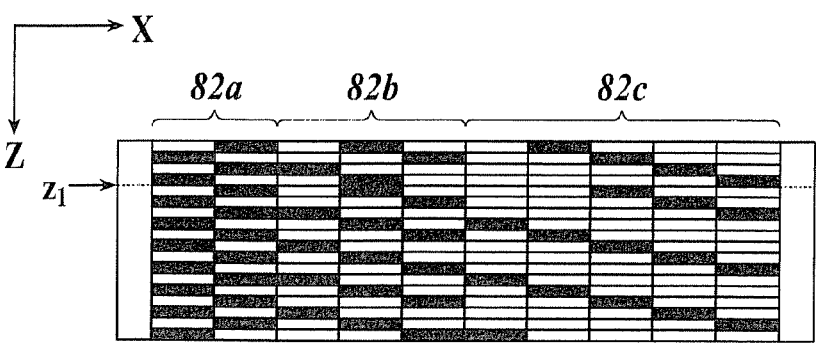
FIG. 13C is a view showing an example of the case where two sheets of paper are omitted in the paper bundle of the plurality of sheets of paper on each of which the prime number code image is printed.

FIG. 13C is a view showing an example of the case where two sheets of paper are omitted at a position $z_1$ in a paper bundle of sheets of paper on each which the prime number code images 82*a*, 82*b*, and 82*c* are printed. Since the prime number code image 82*a* has a repetition pattern at every two pages, no changes of the pattern are found in the case of the omission of two sheets of paper. However, disorder is caused in the repetition patterns formed by the prime number code images 82*b* and 82*c*, and the existence of the printing error can be recognized.

Figure 14A:
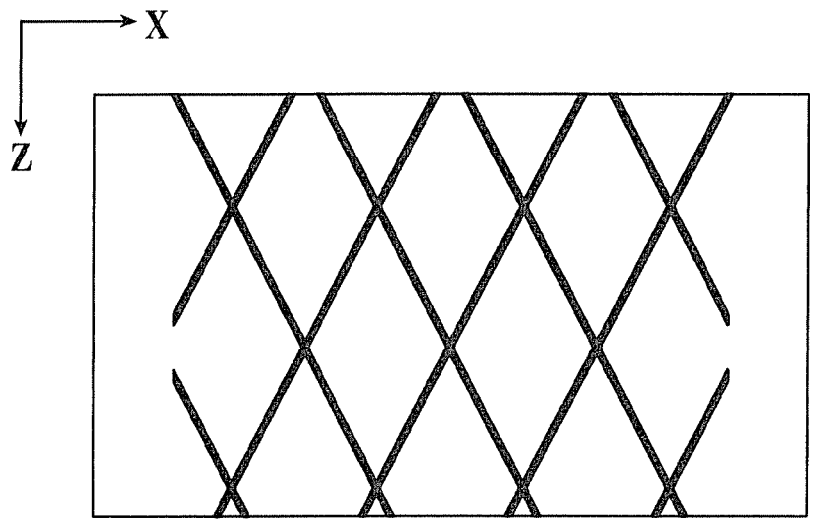
FIG. 14A is a view showing a side face of a paper bundle in which a plurality of sheets of paper on each of which the oblique line forming image is printed is piled up in the order of printing.

FIG. 14A is a view showing a side face of a paper bundle bundled by piling up a plurality of sheets of paper on each of which the oblique line forming image 83 is printed as the inspecting image in the order of printing. The X direction and the Z direction shown in FIG. 14A correspond to the X direction and the Z direction shown in FIG. 5, respectively. When there are no omissions, duplication, and erroneous orders in the printed matter, then each oblique line is continuously formed by the oblique line forming image 83 as shown in FIG. 14A.

Figure 14B:
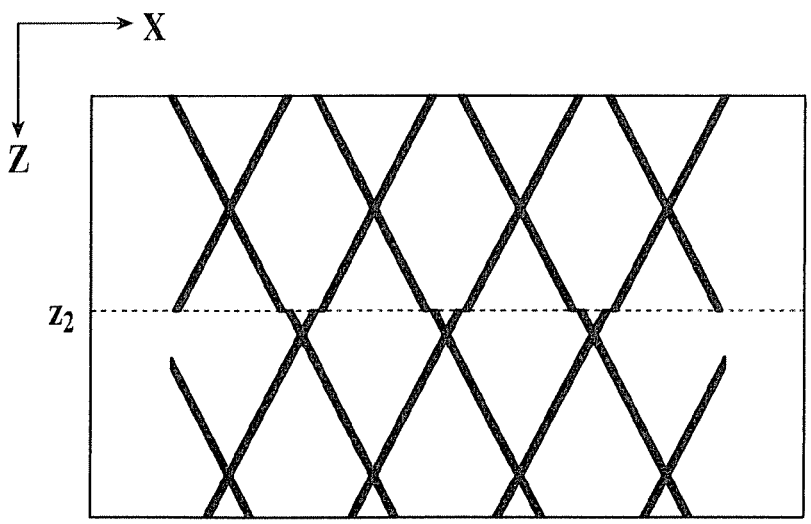
FIG. 14B is a view showing an example of the case where one or a plurality of sheets of paper is omitted in the paper bundle of the plurality of sheets of paper on each of which the oblique line forming image is printed.

FIG. 14B is a view showing an example of the case where one or a plurality of sheets of paper is omitted at a position $z_2$ in the paper bundle composed of the sheets of paper on each of which the oblique line forming image 83 is printed. Disorder is caused in each oblique line formed by the oblique line forming image 83 at the position $z_2$, and consequently the existence of the printing errors can be recognized.

As described above, according to the image forming apparatus 100, the regions of the prime number code images 82*a*, 82*b*, and 82*c* expressed in the black color are sequentially shifted in the extending direction in end parts of sheets of paper, in the order of printing of each sheet of paper in each prime number group. Consequently, when there are any printing errors, disorder is caused in the pattern formed by the prime number code images 82*a*, 82*b*, and 82*c*, and the omissions, duplication, and erroneous orders can be easily detected.

Moreover, since the plurality of prime number code images 82*a*, 82*b*, and 82*c* corresponding to the plurality of different numbers "2," "3," and "5," respectively, is printed, even the omissions, duplication, and erroneous orders of the number of sheets of paper, which individual additional image (only the prime number code image 82*a*, only the prime number code image 82*b*, or only the prime number code image 82*c*) cannot detect, can be easily detected.

For example, the pattern formed on a side of a paper bundle by the prime number code image 82*a* corresponding to the prime number group "2" can detect the omission of a sheet of paper, but cannot detect the omission of two sheets of paper. Moreover, the pattern formed on the side face of the paper bundle by the prime number code image 82*b* corresponding to the prime number group "3" can detect the omission of one or two sheets of paper, but cannot detect the omission of three sheets of paper. Moreover, the pattern formed on the side face of the paper bundle by the prime number code image 82*c* corresponding to the prime number group "5" can detect the omission of one to four sheets of paper, but cannot detect the omission of five sheets of paper. However, the omission of the five sheets of paper can be detected by the patterns formed on the side face of the paper bundle by the prime number code images 82a and 82b.

Moreover, by forming the regions constituting the prime number code images 82a, 82b, and 82c for the numbers of the respective prime numbers and by generating the prime number code image 82 in the order of increase of the prime numbers ("2," "3," "5," and so forth), the prime number code image 82 can be efficiently generated.

For example, when only the prime number code image 82a corresponding to the prime number "2" is printed, then the same pattern is repeated every two sheets of paper. Moreover, when the prime number code images 82a and 82b corresponding to the prime numbers "2" and "3," respectively, are printed, then the same pattern is repeated every six sheets of paper, which is the least common multiple of two and three. Moreover, when the prime number code images 82a, 82b, and 82c corresponding to the prime numbers "2," "3," and "5," respectively, are printed, the same pattern is repeated every 30 sheets of paper, which is the least common multiple of two, three, and five. When the prime number code images 82a and 82b corresponding to the prime numbers "2" and "3," respectively, and a prime number code corresponding to a number "4" are printed, then the same pattern is repeated every 12 sheets of paper, which is the least common multiple of two, three, and four. That is, it can be known that the addition of the prime number code image 82c corresponding to not the number "4" but the prime number "5" to the prime number code images 82a and 82c corresponding to the prime numbers "2" and "3" results in more efficient detection at the time of the generation of the prime number code image 82 capable of detecting the omissions, duplication, and erroneous orders of sheets of paper as much as possible.

Moreover, by printing the oblique line forming image 83 in addition to the prime number code image 82, disorder is caused in the oblique lines formed by the oblique line forming image 83 at the time of the occurrence of a printing error, and the omissions, duplication, and erroneous orders of printed matter can be easily detected. In particular, the oblique line forming image 83 is effective in the case of detecting the omissions, duplication, and erroneous orders of a relatively large number of sheets of paper, and the prime number code image 82 is effective in the case of detecting the omissions, duplication, and the erroneous orders of a relatively small number of sheets of paper.

Incidentally, the descriptions of the embodiment mentioned above concern only an example of the image forming apparatus according to the present invention, and the present invention is not limited to the descriptions. Also as to the configurational details and operational details of each component constituting the image forming apparatus can be suitably changed without departing from the sprit and scope of the present invention.

Figure 15:
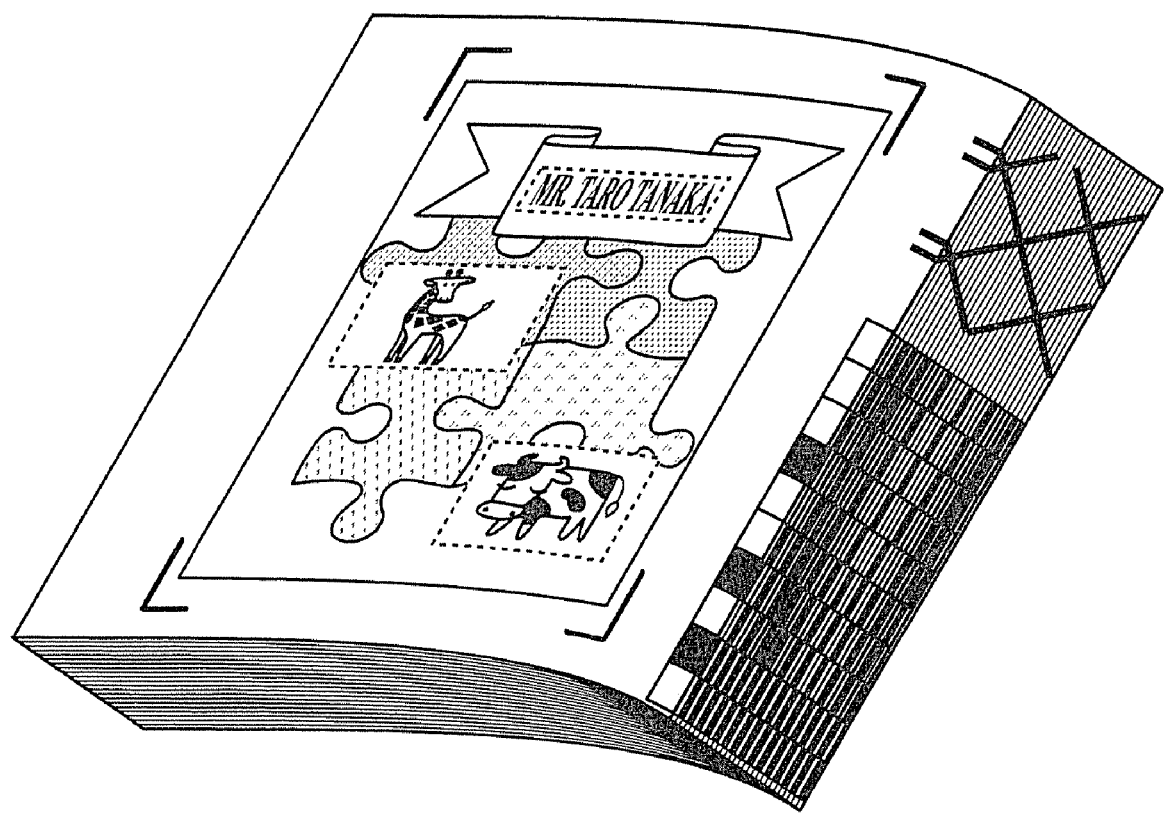
FIG. 15 is a perspective view for illustrating the method of confirming patterns by bending the whole paper bundle.

For example, when the pattern formed on a side face of sheets of paper cannot be identified in such a case where the thickness of the sheets of paper is extremely thin, then the pattern may be recognized by bending the paper bundle as shown in FIG. 15.

Figure 16:
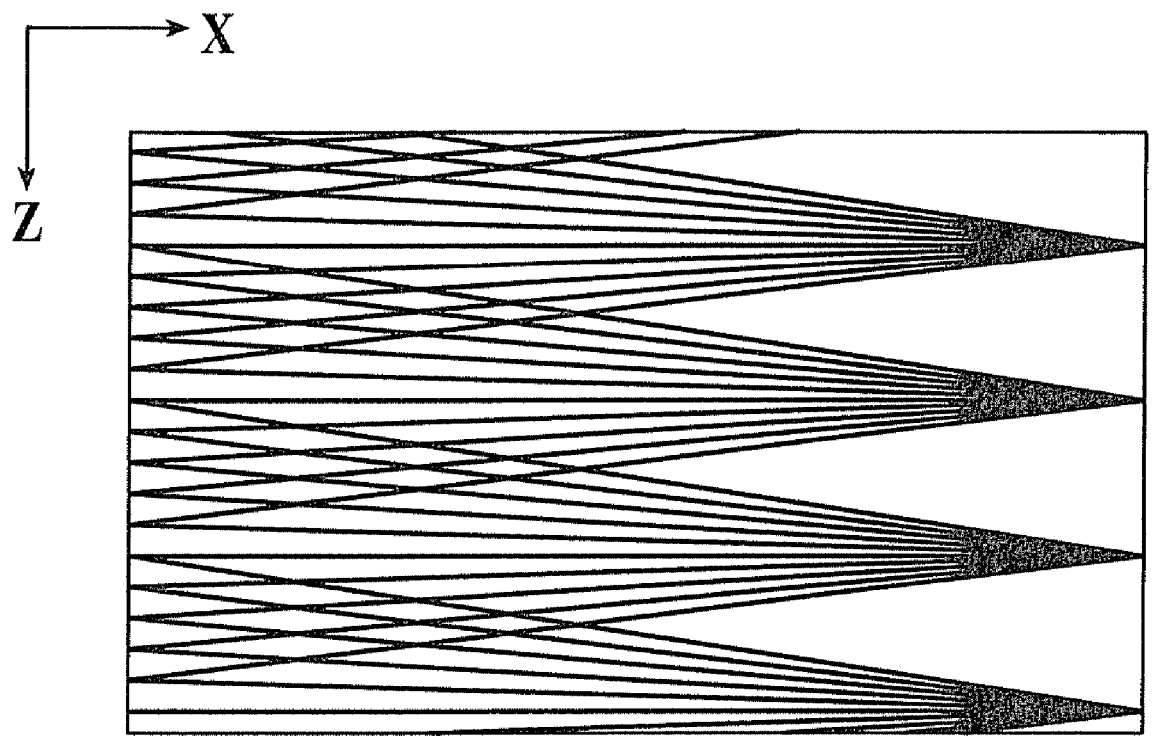
FIG. 16 is a view showing a modification of an oblique line pattern formed by an oblique line forming image.

Moreover, FIG. 16 shows a modification of the pattern of oblique lines formed by an oblique line forming image. The X direction shown in FIG. 16 is the extending direction of an end part of a sheet of paper on which the oblique line forming image is printed, and the Z direction is the thickness direction of the sheets of paper (the direction of piling up the sheets of paper in the order of printing). When the oblique lines are formed with a fixed interval as the example shown in FIG. 14A, then the detection of abnormality becomes difficult when the omitted number of sheets of paper accidentally coincides with the intervals of the oblique lines. Accordingly, the oblique line forming image may be printed so that the oblique lines may be formed at various angles with respect to the thickness direction of the sheets of paper as shown in FIG. 16.

Moreover, although the descriptions have been given to the case of expressing any one of the regions constituting each of the prime number code images 82a, 82b, and 82c in the black color and expressing the other regions in the white color in the aforesaid embodiment, the one region and the other regions may be expressed in any color as long as the colors differ from each other.

Moreover, although the descriptions have been given to the case of printing the prime number code images 82a, 82b, and 82c corresponding to the prime number groups "2," "3," and "5," respectively, in the present embodiment, the maximum value N of the prime number groups can be arbitrarily changed. When the prime number code images corresponding up to the maximum value N of the prime number groups are printed, the same pattern is repeated for every ($2 \times 3 \times 5 \times 7 \times \ldots \times N$) sheets of paper.

Although the example of using the ROM 30 as the computer readable medium storing the programs for executing the respective processes has been disclosed in the above descriptions, the computer readable medium is not limited to the ROM 30. As the other computer readable media, a nonvolatile memory, such as a flash memory, and a portable recording media, such as a compact disc read only memory (CD-ROM), can be applied. Moreover, as a medium to provide the data of a program through a communication line, a carrier wave may be applied.

According to one aspect of the preferred embodiment of the present invention, there is provided an image forming method to perform a printing for a plurality of sheets of paper, comprising:

expressing any one region in a first color, the one region being one of a predetermined number of regions which are provided at an end part of each sheet of the plurality of sheets of paper and are continuous in an extending direction of the end part of the sheets;

expressing the other regions except the one region in a second color; and printing an additional image in which the one region expressed in the first color is shifted sequentially in the extending direction of the end part of the sheets, in an order of the printing of each sheet of paper.

Since the image forming method sequentially shifts the region expressed in a first color in the extending directions of end parts of sheets of paper in the order of the printing of each of the sheets of paper, disorder is caused in a pattern formed by the additional image when a printing error is caused, and consequently the omissions, duplication, and erroneous orders of printed matter can be easily detected.

Preferably, in the image forming method, the predetermined number is a prime number.

Since the image forming method sequentially shifts the region expressed in a first color in the extending directions of end parts of sheets of paper in the order of the printing of each of the sheets of paper, disorder is caused in a pattern formed by the additional image when a printing error is caused, and consequently the omissions, duplication, and erroneous orders of printed matter can be easily detected.

Preferably, in the image forming method, the predetermined number of regions are respectively provided for a plurality of numbers which differ from each other, and a plurality of additional images which respectively correspond to the plurality of numbers which differ from each other are printed in the end part of each sheet at positions which differ from each other.

Since a plurality of additional images corresponding to a plurality of different numbers are printed by the image forming method, respectively, the omissions, duplication, and erroneous orders of sheets of paper that cannot be detected by individual additional images can be also easily detected.

Preferably, the image forming method comprises:

shifting an oblique line forming image by a predetermined length in the extending direction of the end part of the sheets, in the order of the printing, the oblique line forming image having a predetermined width in the extending direction of the end part of the sheets; and printing the oblique line forming image in the end part of each sheet at a position which differs from where the additional image is printed.

By the image forming method, disorder is caused in oblique lines formed by an oblique line forming image when a printing error is caused, and consequently omissions, duplication, and erroneous orders of printed matter can be easily detected.

According to another aspect of the preferred embodiment of the present invention, there is provided an image forming apparatus to perform a printing of a printing image on each of a plurality of sheets of paper, wherein any one region is expressed in a first color, the one region being one of a predetermined number of regions which are provided at an end part of each sheet of the plurality of sheets of paper and are continuous in an extending direction of the end part of the sheets; and the other regions except the one region are expressed in a second color, the image forming apparatus comprising:

a control section to synthesize an additional image in which the one region expressed in the first color is shifted sequentially in the extending direction of the end part of the sheets, with the printing image, in an order of the printing of each sheet of paper; and a printing section to print the synthesized image.

Since the image forming method sequentially shifts the region expressed in a first color in the extending directions of end parts of sheets of paper in the order of the printing of each of the sheets of paper, disorder is caused in a pattern formed by the additional image when a printing error is caused, and consequently the omissions, duplication, and erroneous orders of printed matter can be easily detected.

Preferably, in the image forming apparatus, the predetermined number is a prime number.

Since the image forming method sequentially shifts the region expressed in a first color in the extending directions of end parts of sheets of paper in the order of the printing of each of the sheets of paper, disorder is caused in a pattern formed by the additional image when a printing error is caused, and consequently the omissions, duplication, and erroneous orders of printed matter can be easily detected.

Preferably, in the image forming apparatus, the predetermined number of regions are respectively provided for a plurality of numbers which differ from each other, and the control section synthesizes a plurality of additional images which respectively correspond to the plurality of numbers which differ from each other with the printing image, in the end part of each sheet at positions which differ from each other.

Since a plurality of additional images corresponding to a plurality of different numbers are printed by the image forming method, respectively, the omissions, duplication, and erroneous orders of sheets of paper that cannot be detected by individual additional images can be also easily detected.

Preferably, in the image forming apparatus, the control section shifts an oblique line forming image by a predetermined length in the extending direction of the end part of the sheets, in the order of the printing, the oblique line forming image having a predetermined width in the extending direction of the end part of the sheets, and synthesizes the shifted oblique line forming image with the printing image in the end part of each sheet at a position which differs from where the additional image is printed.

By the image forming method, disorder is caused in oblique lines formed by an oblique line forming image when a printing error is caused, and consequently omissions, duplication, and erroneous orders of printed matter can be easily detected.

The present U.S. patent application claims a priority under the Paris Convention of Japanese patent application No. 2007-296721 filed on Nov. 15, 2007, which shall be a basis of correction of an incorrect translation.

What is claimed is:

1. An image forming method to perform printing for a plurality of sheets of paper, comprising:
   receiving print data for printing a printing image and an additional image on each sheet of paper from the plurality of sheets;
   expressing any one region of the additional image in a first color, the additional image including a predetermined number of regions which are provided at an end part of each sheet of the plurality of sheets of paper and which are continuous in an extending direction of the end part of the sheets;
   expressing the remaining regions from the predetermined number of regions of the additional image in a second color; and
   printing the printing image together with the additional image on each sheet of paper such that the one region of the additional image expressed in the first color is shifted sequentially in the extending direction of the end part of the sheets, in an order of the printing of each sheet of paper, wherein
   the additional image includes a plurality of images;
   the predetermined number of regions are respectively provided for a plurality of numbers which differ from each other, and
   the plurality of additional images, which respectively correspond to the plurality of numbers which differ from each other, are printed in the end part of each sheet at positions which differ from each other, and
   when the printing is performed normally to each sheet of paper and when each sheet of paper is layered on each other in order, a geometric pattern is formed with respect to each region on a side surface of a bundle of printed sheets of paper, each geometric pattern being different from each other.

2. The image forming method of claim 1, wherein the predetermined number is a prime number.

3. The image forming method of claim 1, comprising:
   shifting an oblique line forming image by a predetermined length in the extending direction of the end part of the sheets, in the order of the printing, the oblique line forming image having a predetermined width in the extending direction of the end part of the sheets; and printing the oblique line forming image in the end part of each sheet at a position which differs from where the additional image is printed.

4. An image forming apparatus to perform printing on each of a plurality of sheets of paper, comprising:
   a communication section for receiving print data for printing a printing image and an additional image on each sheet of paper from the plurality of sheets, wherein
      any one region of the additional image is expressed in a first color, the additional image including a predetermined number of regions which are provided at an end part of each sheet of the plurality of sheets of paper and which are continuous in an extending direction of the end part of the sheets; and
      the remaining regions from the predetermined number of regions of the additional image are expressed in a second color,
   the image forming apparatus further comprising:
   a control section to synthesize, on each sheet of paper, the additional image, wherein the one region of the additional image expressed in the first color is shifted sequentially in the extending direction of the end part of the sheets, with the printing image, in an order of the printing of each sheet of paper; and
   a printing section to print the synthesized image, wherein
   the addition image includes a plurality of images,
   the predetermined number of regions are respectively provided for a plurality of number which differ from each other,
   the control section synthesizes the plurality of additional images, which respectively correspond to the plurality of numbers which differ from each other with the printing image, in the end part of each sheet at positions which differ from each other, and
   when the printing is performed normally to each sheet of paper and when each sheet of paper is layered on each other in order, a geometric pattern is formed with respect to each region on a side surface of a bundle of sheets of paper, each geometric pattern being different from each other.

5. The image forming apparatus of claim 4, wherein the predetermined number is a prime number.

6. The image forming apparatus of claim 4, wherein
   the additional image includes a plurality of images;
   the predetermined number of regions are respectively provided for a plurality of numbers which differ from each other; and
   the control section synthesizes the plurality of additional images which respectively correspond to the plurality of numbers which differ from each other with the printing image, in the end part of each sheet at positions which differ from each other.

7. The image forming apparatus of claim 4, wherein
   the control section shifts an oblique line forming image by a predetermined length in the extending direction of the end part of the sheets, in the order of the printing, the oblique line forming image having a predetermined width in the extending direction of the end part of the sheets, and synthesizes the shifted oblique line forming image with the printing image in the end part of each sheet at a position which differs from where the additional image is printed.

\* \* \* \* \*